US006987904B2

(12) United States Patent
Kawanishi et al.

(10) Patent No.: US 6,987,904 B2
(45) Date of Patent: Jan. 17, 2006

(54) VARIABLE-OPTICAL-DELAY APPARATUS

(75) Inventors: Tetsuya Kawanishi, Koganei (JP); Masayuki Izutsu, Koganei (JP)

(73) Assignee: National Institute of Information and Communications Technology, Koganei (JP)

(*) Notice: Subject to any disclaimer, the term of this patent is extended or adjusted under 35 U.S.C. 154(b) by 36 days.

(21) Appl. No.: 10/345,971

(22) Filed: Jan. 17, 2003

(65) Prior Publication Data

US 2003/0190119 A1 Oct. 9, 2003

(30) Foreign Application Priority Data

Jan. 17, 2002 (JP) ............................ 2002-008670

(51) Int. Cl.
*G02B 6/26* (2006.01)

(52) U.S. Cl. ............................................ 385/27; 385/1

(58) Field of Classification Search .................. 385/27, 385/39, 122, 14, 15; 359/326–332; 372/21, 372/22

See application file for complete search history.

(56) References Cited

U.S. PATENT DOCUMENTS

| | | | | |
|---|---|---|---|---|
| 5,073,886 | A * | 12/1991 | Sasaki et al. | 369/124.14 |
| 5,101,291 | A * | 3/1992 | Jopson | 398/79 |
| 5,153,933 | A * | 10/1992 | Smith et al. | 385/27 |
| 5,581,642 | A * | 12/1996 | Deacon et al. | 385/15 |
| 5,822,476 | A * | 10/1998 | Jopson | 385/27 |
| 5,852,687 | A * | 12/1998 | Wickham | 385/14 |
| 6,522,795 | B1 * | 2/2003 | Jordan et al. | 385/10 |

FOREIGN PATENT DOCUMENTS

| | | | |
|---|---|---|---|
| JP | 05266677 | A * | 10/1993 |
| JP | 08160481 | A * | 6/1996 |
| JP | 08186540 | A * | 7/1996 |
| JP | 8-262514 | | 10/1996 |
| JP | 10-213830 | | 8/1998 |
| JP | 2000-171762 | | 6/2000 |
| JP | 2001-209082 | | 8/2001 |
| JP | 2001-264714 | | 9/2001 |
| JP | 2001264825 | A * | 9/2001 |
| JP | 2002062488 | A * | 2/2002 |
| JP | 2003057698 | A * | 2/2003 |

* cited by examiner

OTHER PUBLICATIONS

S. Shimotsu, et al., Technical Report of IEICE, pp. 29-34, "Optical SSB Modulation Using Integrated LiNbO3 Modulator", Jul. 2000 ( with English Abstract ).

*Primary Examiner*—Ellen E. Kim
(74) *Attorney, Agent, or Firm*—Oblon, Spivak, McClelland, Maier & Neustadt, P.C.

(57) ABSTRACT

A variable-optical-delay apparatus with a single wavelength converter and optical loop path has an optical modulator able to adjust the delay time according to the input optical signal. The variable-optical-delay apparatus has an optical input section and an optical output section, an optical filter and a wavelength shifter able to adjust an amount by which a wavelength of an input optical signal is shifted disposed on an optical path extending from the input section to the output section. The input optical signal is output from the output section after passing the wavelength shifter a number of times that is determined according to the input optical signal. A resonant type optical modulator can be used that is set between filters, or set between a filter and a reflector. Part of an optical path from the input section to the output section is in the form of an optical loop, an optical modulator is provided on the optical loop.

9 Claims, 12 Drawing Sheets

FIG_9

VARIABLE-OPTICAL-DELAY APPARATUS

BACKGROUND OF THE INVENTION

1. Field of the Invention

The present invention relates to a variable-optical-delay apparatus for delaying an optical signal by a delay time determined in accordance with an input optical signal.

2. Description of the Prior Art

Listed below are methods used to control the time-delay of an optical signal.

1) A method in which a plurality of optical paths of different lengths is prepared and the optical path to be used is selected according to the delay time required.

2) A method of controlling the delay time by shifting the optical signal frequency and propagating the signal along an optical path having frequency dispersion characteristics.

3) A method of controlling the delay time by shifting the optical signal frequency and using a reflector having frequency dispersion characteristics, such as a filter, to reflect the optical path.

4) A method in which the optical signal is converted to an electric signal, and the electric signal is delayed and then converted back to an optical signal.

5) A method that uses what is called a cyclic type optical packet buffer in which a switch positioned between the optical input and output sections is used to connect an optical fiber loop delay apparatus that includes an optical amplifier.

Japanese Patent Laid-Open Publication No 2001-209082 discloses an optical packet buffer, shown in FIG. 9, that is similar to the present invention. The object of the disclosed invention is to facilitate size-reduction and integration, eliminate instability caused by oscillation and provide the ability to handle variable-length packets, and is therefore not constrained by packet length. In this optical packet buffer, optical signals input via an input waveguide are converted to a fixed wavelength by a variable-wavelength conversion circuit and input to the delay loop via an optical coupler. Each time the signals circulate within the delay loop, a wavelength shifter shifts the signal wavelength by a set amount. The signals thus are passed through a specific wavelength extraction circuit, which extracts signals of a specific wavelength and outputs those signals via an output waveguide.

Thus, optical packets input via the input waveguide are converted to a prescribed wavelength by the variable-wavelength conversion circuit and input to the delay loop via an optical coupler. The optical packet buffer has a wavelength shifter that shifts the wavelength of the signals. Signals having a wavelength that is not specified are passed through the loop from port a to port b, while signals having a specific wavelength are output through port c by the specific wavelength extraction circuit disposed between ports a and c. The number of cycles (the number of times the optical signal packets pass the wavelength shifter) undergone by the packets from input to separation by the specific wavelength extraction circuit, is determined by the packet length set by the variable-wavelength conversion circuit, thereby determining the packet delay time.

As described, the variable-wavelength conversion circuit is used to set the delay time of the above optical packet buffer by setting the wavelength of the optical packets prior to the entry of the packets into the delay loop. Thus, a variable-wavelength conversion circuit and a wavelength shifter are used to change the wavelength of the optical packets.

SUMMARY OF THE INVENTION

Therefore, in the case of the above prior-art optical signal delay apparatus using a loop path and a wavelength shifter, the delay time is controlled by using a plurality of wavelength converters.

An object of the present invention is therefore to provide a variable-optical-delay apparatus that can adjust the amount of delay of an input optical signal, using a single wavelength converter and optical loop.

In accordance with a first aspect of the invention, the above object is attained by a variable-optical-delay apparatus comprising an optical input section and an optical output section, an optical filter and a wavelength shifter able to adjust an amount by which a wavelength of an input optical signal is shifted disposed on an optical path extending from the input section to the output section, wherein the input optical signal is output from the output section after passing the wavelength shifter a number of times that is determined according to the input optical signal.

In a second aspect in additional to the first aspect, the variable-optical-delay apparatus in which au input optical signal is output from the output section after passing the wavelength shifter a number of times that is determined according to the input optical signal includes a plurality of filters disposed on each side of an optical modulator.

In a third aspect in additional to the first aspect, the variable-optical-delay apparatus in which an input optical signal is output from the output section after passing the wavelength shifter a number of times that is determined according to the input optical signal includes a filter and a reflector disposed with an optical modulator therebetween.

In a fourth aspect in additional to the first aspect, the variable-optical-delay apparatus in which an input optical signal is output from the output section after passing the wavelength shifter a number of times that is determined according to the input optical signal, part of the optical path from the input section to the output section is in the form of an optical loop, an optical modulator is provided on the optical loop, a first filter is provided on the optical path from the input section to the optical loop, and a second filter that differs from the first filter is provided on the optical path from the optical loop to the output section.

In a fifth aspect in addition to the fourth aspect, the optical path is deflected by a circulator provided on the optical path at least one end of the first filter.

In a sixth aspect in addition to any of the configurations in the second to fifth aspects, the optical modulator is a resonant type optical modulator.

In a seventh aspect in addition to any of the configurations in the second to fifth aspects, the optical modulator is a single-sideband modulator.

In an eighth aspect according to any one of the first to seventh aspects the variable-optical-delay apparatus comprises a plurality of variable-optical-delay apparatuses provided along a continuous optical path, each variable-optical-delay device having a different delay time. For example, the number of variable-optical-delay apparatuses can be set so that each device corresponds to a denary digit.

In a ninth aspect, the variable-optical-delay apparatus comprises a plurality of variable-optical-delay apparatuses provided along a continuous optical path, wherein the sum of the optical signal frequency shifts is zero, so that the optical output signal has the same frequency as the optical input signal.

Further features of the invention, its nature and various advantages will be more apparent from the accompanying drawings and following detailed description of the invention.

DESCRIPTION OF THE PREFERRED EMBODIMENT

The embodiments of the present invention are described below, with reference to the drawings. Except where stated otherwise, parts having the same functions have been given the same reference symbols.

EXAMPLE 1

Figure 1:
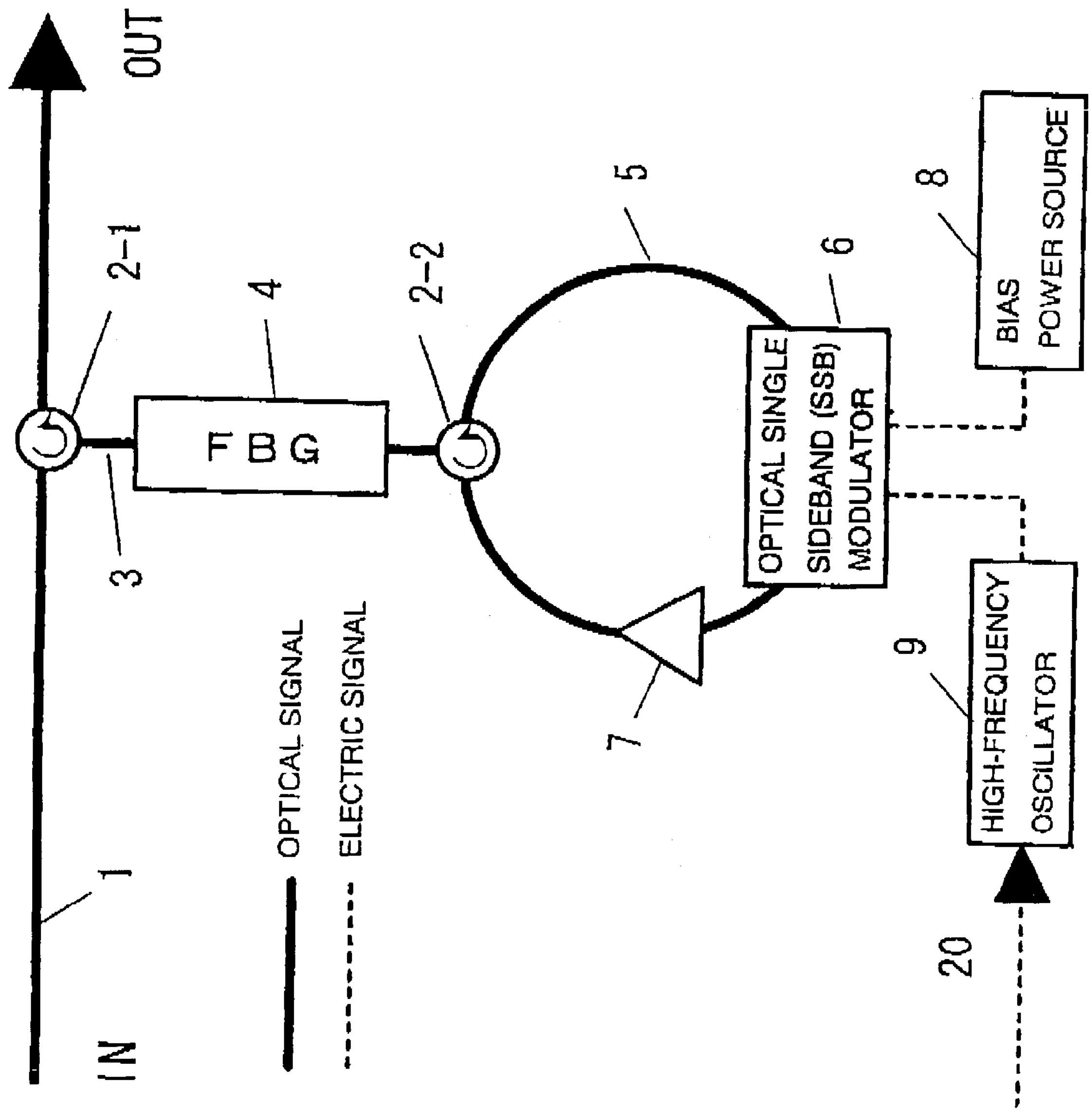
FIG. 1 is a block diagram of a variable-optical-delay apparatus that uses an optical path loop, according to a first embodiment of the present invention.

FIG. 1 shows an example of a first embodiment of the variable-optical-delay apparatus of the invention, which uses an optical path in the form of a loop having a circumference of 20 meters. An input optical signal (wavelength: 1549.8 nm) passes along optical path 1 and is directed onto optical path 3 by a circulator 2-1. Provided on the optical path 3 is a fiber Bragg grating (FBG) 4 used as a filter. The FBG 4 has a reflection band with a bandwidth of 250 GHz (1550–1551 nm). The input optical signal has to be at a frequency that is slightly lower (or higher) than the frequencies reflected by the FBG 4. Signals transmitted by the FBG 4 are directed onto the loop path 5 by a circulator 2—2. The loop path 5 is provided with an optical single-sideband (SSB) modulator 6. To reduce the amount of space occupied by the apparatus, a resonant type optical SSB modulator can be used, which provides high efficiency. Details of such a resonant type optical SSB modulator are described in Reference 1 (Shimotsu et al., "Optical SSB modulator using integrated type LN modulator," IEICE Technical Report, OEIC OPE 2000-37, LQE 2000-31 (2000-07), 29–34, 2000).

Figure 8:
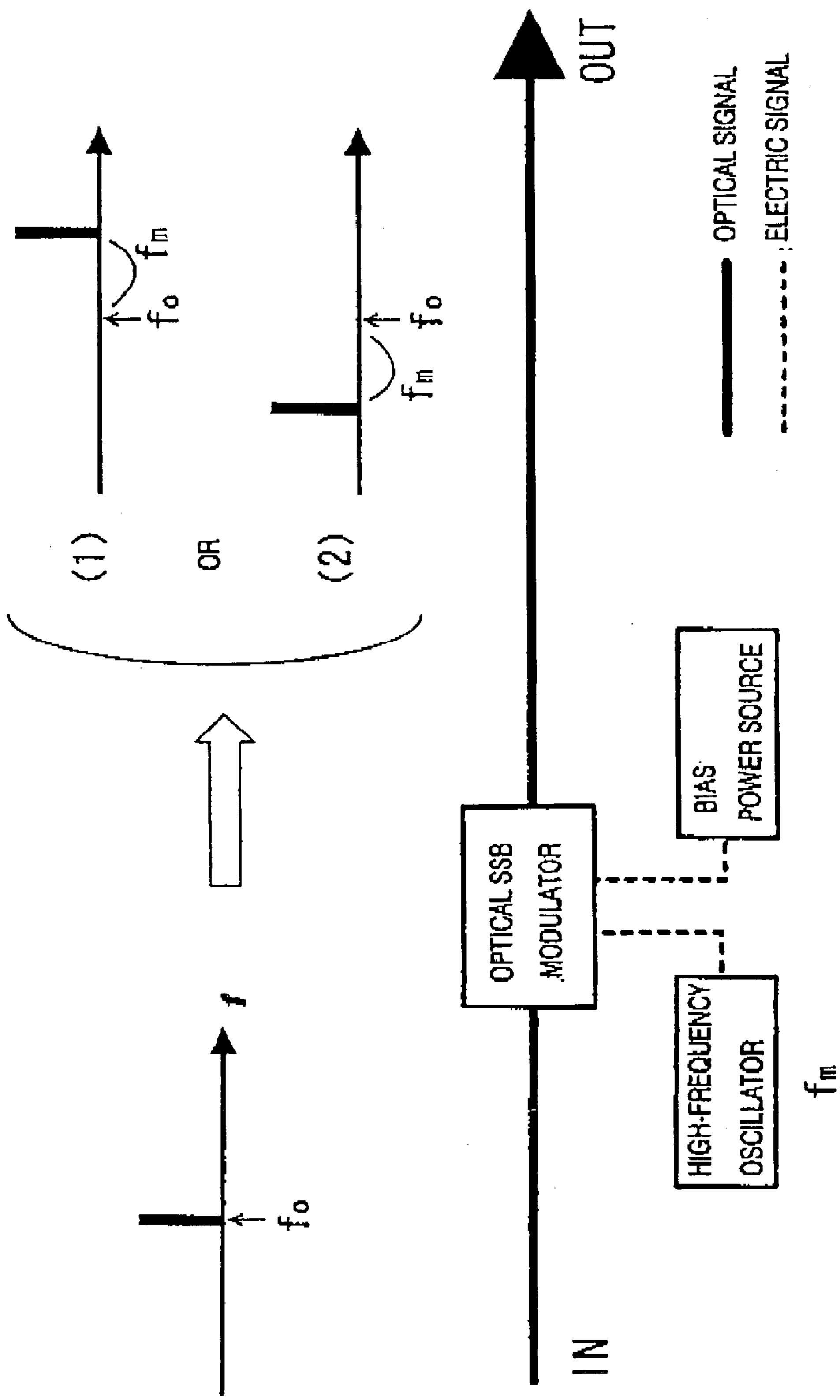
FIG. 8 illustrates the operation of an optical single-sideband modulator.
Figure 9:
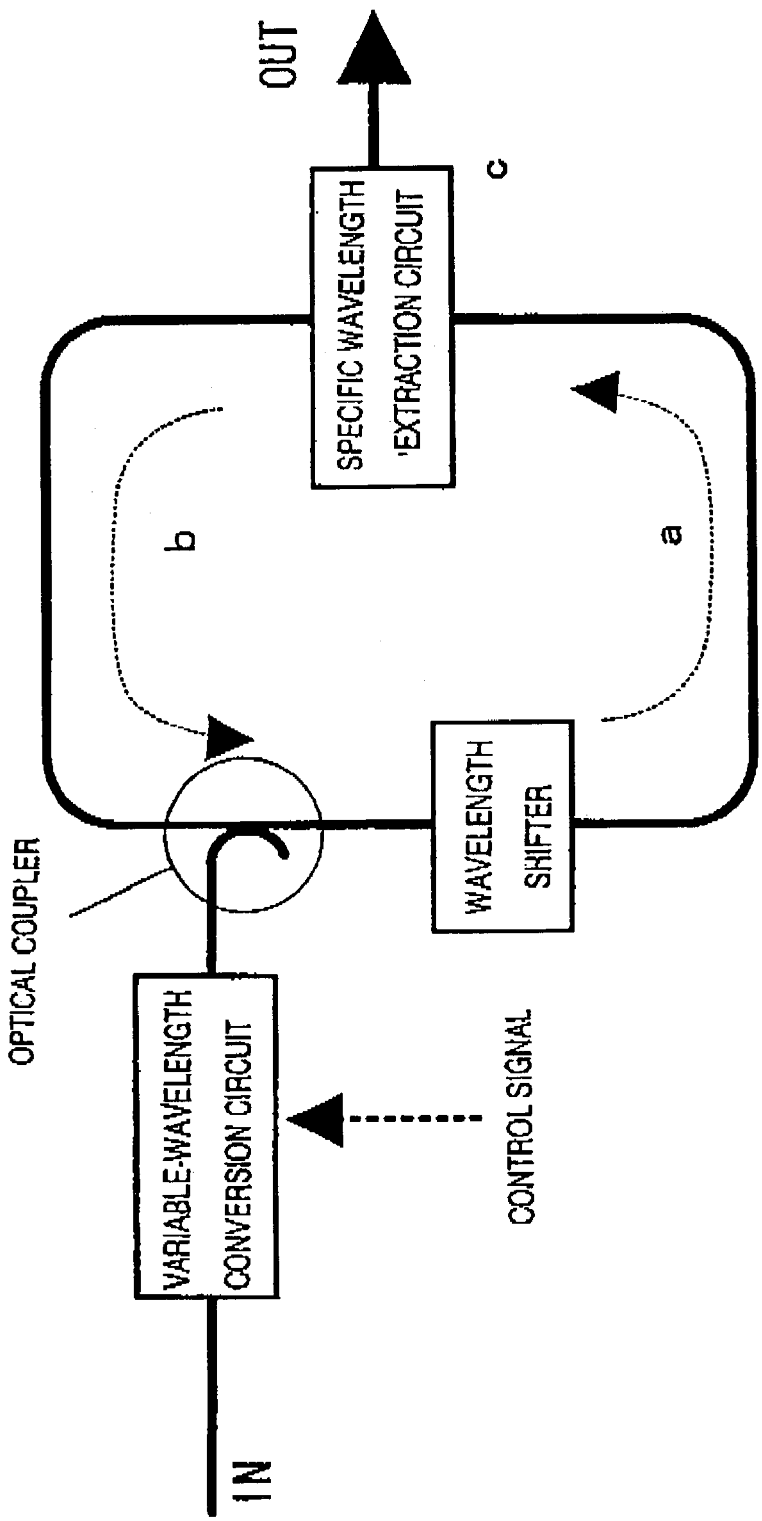
FIG. 9 is a block diagram of a prior-art optical packet buffer.

A high-frequency oscillator 9 supplies a high-frequency electric signal to the SSB modulator 6. The frequency of the high-frequency electric signal is determined in accordance with an electric signal corresponding to the optical signal supplied to the high-frequency oscillator 9 via wiring line 20. By means of this modulator, the frequency of an input optical signal is increased (or decreased) by the oscillation frequency of the high-frequency oscillator 9, which is 50 GHz (0.40 nm), as shown in FIG. 8. In this way, the optical SSB modulator functions as a frequency shifter. The frequency-shifted optical signal is amplified by an erbium-doped fiber amplifier (EDFA) 7 and returns to the circulator 2—2, whereby it is directed to the FBG 4, frequency-shifted by reflection by the FBG 4, and thereby is returned to the loop path 5, where it undergoes further a further shift in frequency. The signal thus undergoes six frequency shifts until it can pass through the FBG 4. After passing through the FBG 4, the signal is returned to the optical path 1 by the circulator 2-1 and output. This enables a signal delay of 1200 ns to be achieved. By using a high-frequency oscillator 9 having an oscillation frequency of 40 GHz, a delay of 1400 ns can be achieved by circulating the signal through the loop seven times. As can be understood from this example, each apparatus has its own delay increments.

EXAMPLE 2

Figure 2:
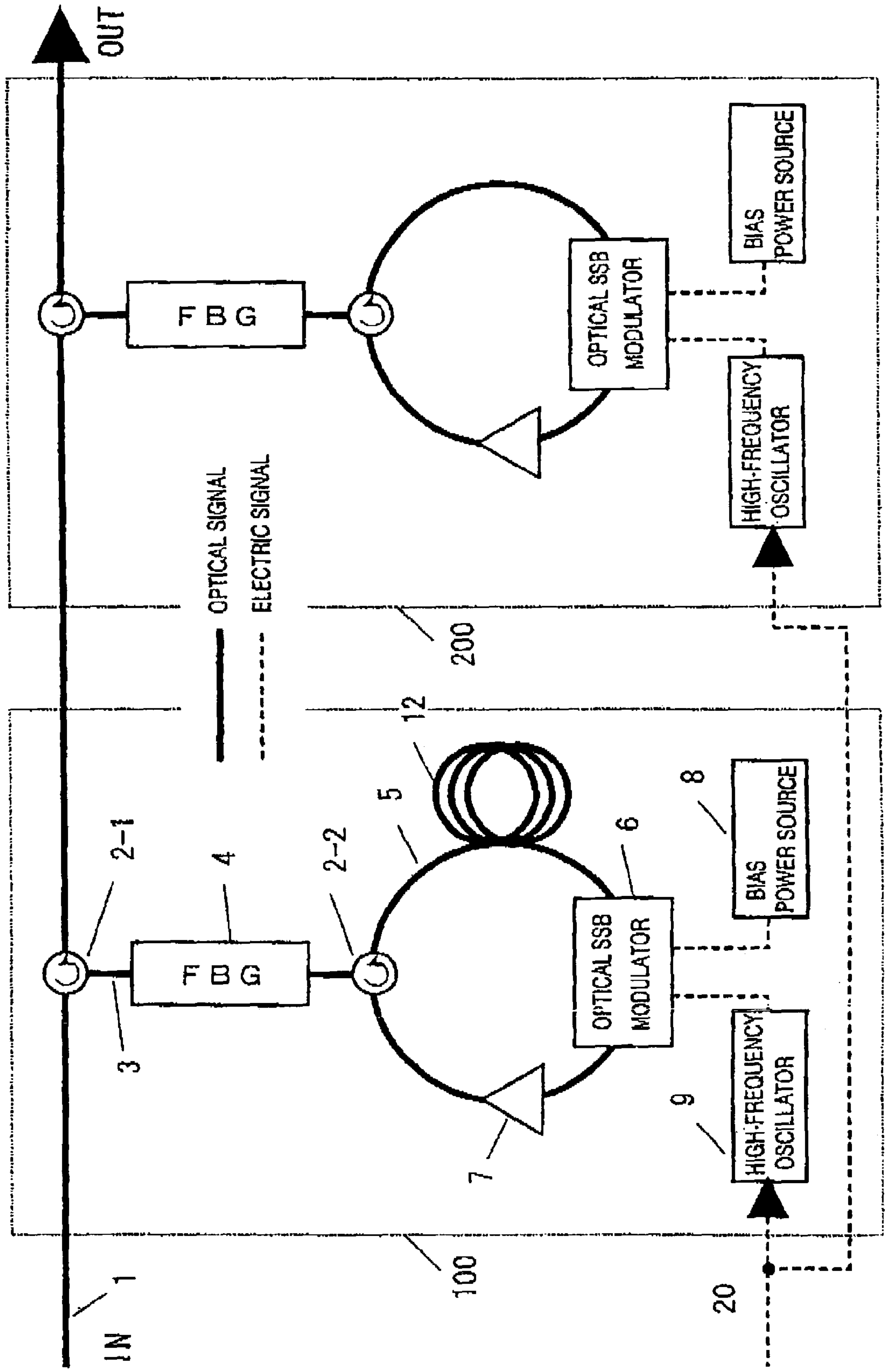
FIG. 2 is a block diagram of a second embodiment in which the variable-optical-delay apparatus comprises a plurality of apparatuses in a series configuration.

FIG. 2 shows an example of a second embodiment comprising two of the variable-optical-delay apparatuses in the optical loop shown in FIG. 1. These apparatuses 100 and 200 are arranged in series with respect to the optical path 1. In this case, it is preferable for the delay increments imposed by the variable-optical-delay apparatus 200 to be an integer multiple of the delay increments of the variable-optical-delay apparatus 100, such as ten times the delay. Selection of these increments makes it possible to readily achieve double-digit delays.

EXAMPLE 3

Figure 3:
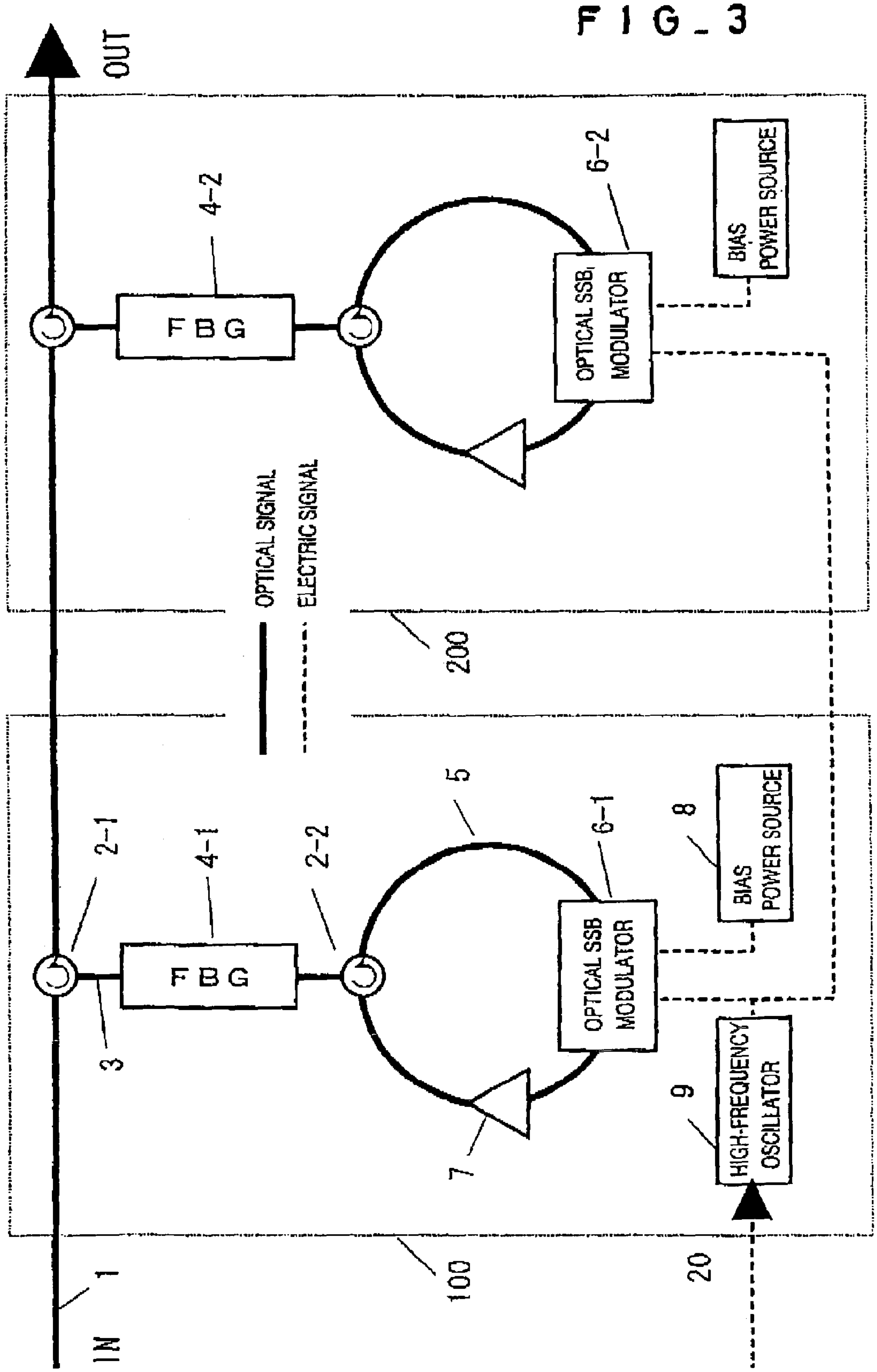
FIG. 3 is a block diagram of a third embodiment that enables output of an optical signal having the same frequency as an input optical signal.

In the first example, the frequency of the output optical signal is different to that of the input optical signal. FIG. 3 shows an example of a third embodiment in which this difference is eliminated, so that the input and output signals have the same frequency. A variable-optical-delay apparatus 100 having the same loop path as that of FIG. 1 and an optical SSB modulator 6-1 to increase the signal frequency, and a variable-optical-delay apparatus 200 having the same loop path as that of FIG. 1 and an optical SSB modulator 6-2 to decrease the signal frequency, are disposed in series with respect to the optical path 1. The modulation frequencies are the same, so the signal frequency is increased by the variable-optical-delay apparatus 100 and decreased by the same amount by the variable-optical-delay apparatus 200. As a result, the output optical signal has the same frequency as the input optical signal.

EXAMPLE 4

Figure 4:
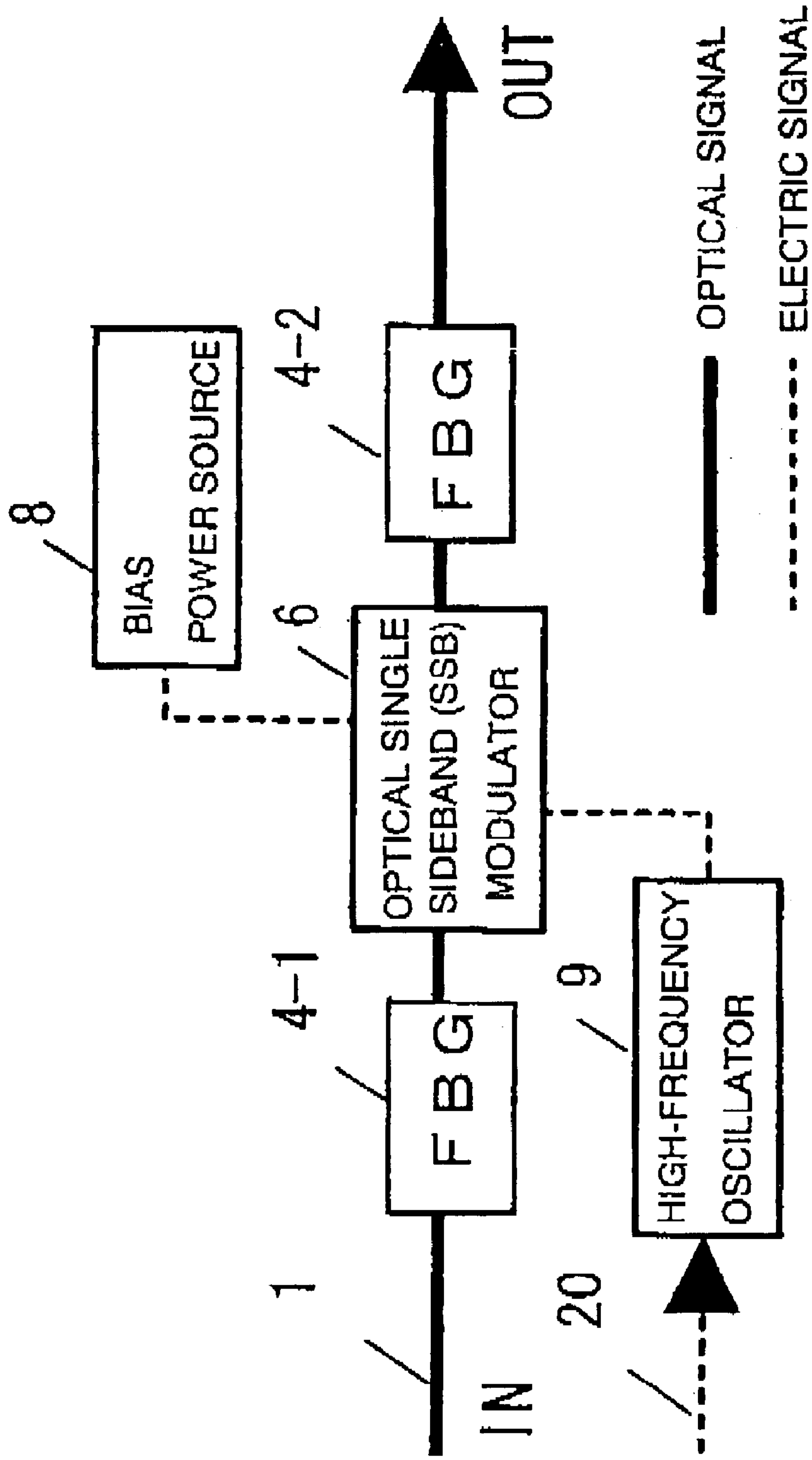
FIG. 4 is a block diagram of a fourth embodiment comprising two fiber Bragg grating filters and a single-sideband modulator between the gratings.

The examples of the above embodiments use optical loop paths, but the variable-optical-delay apparatus can be configured without the use of loop paths. FIG. 4 shows such an arrangement, which is an example of a fourth embodiment. In this example, the variable-optical-delay apparatus comprises two FBG filters and an optical SSB modulator set between the FBG filters. An optical signal (wavelength: 1549.8 nm) input via optical path 1 is transmitted by an FBG 4-1 having a reflection bandwidth of 250 GHz (1550–1551 nm). The input optical signal has to be at a frequency that is slightly lower (or higher) than the frequencies reflected by the FBG 4-1. Signals transmitted by the FBG 4-1 are frequency-shifted by a SSB modulator 6 used as the optical modulator, and fall incident on FBG 4-2 having the same characteristics as the FBG 4-1. The FBG 4-2 reflects the signal, which is again frequency-shifted and falls incident on the FBG 4-1. If the signal is within the reflection bandwidth of the FBG 4-1, it is again reflected. This operation is repeated until the signal is outside the reflection bandwidth and is transmitted by the FBG 4-1 or FBG 4-2. When the system is set to raise the optical wavelength, with respect to the reflection bandwidth, it is desirable to set the FBG 4-1 to the shorter wavelength side by an amount that is not less than the amount of one frequency-shifting operation by the FBG 4-2. Conversely, when tie system is set to lower the optical wavelength, the FBG 4-1 should be set to the longer wavelength side by an amount that is not less than the amount of one frequency-shifting operation by the FBG 4-2.

EXAMPLE 5

Figure 5:
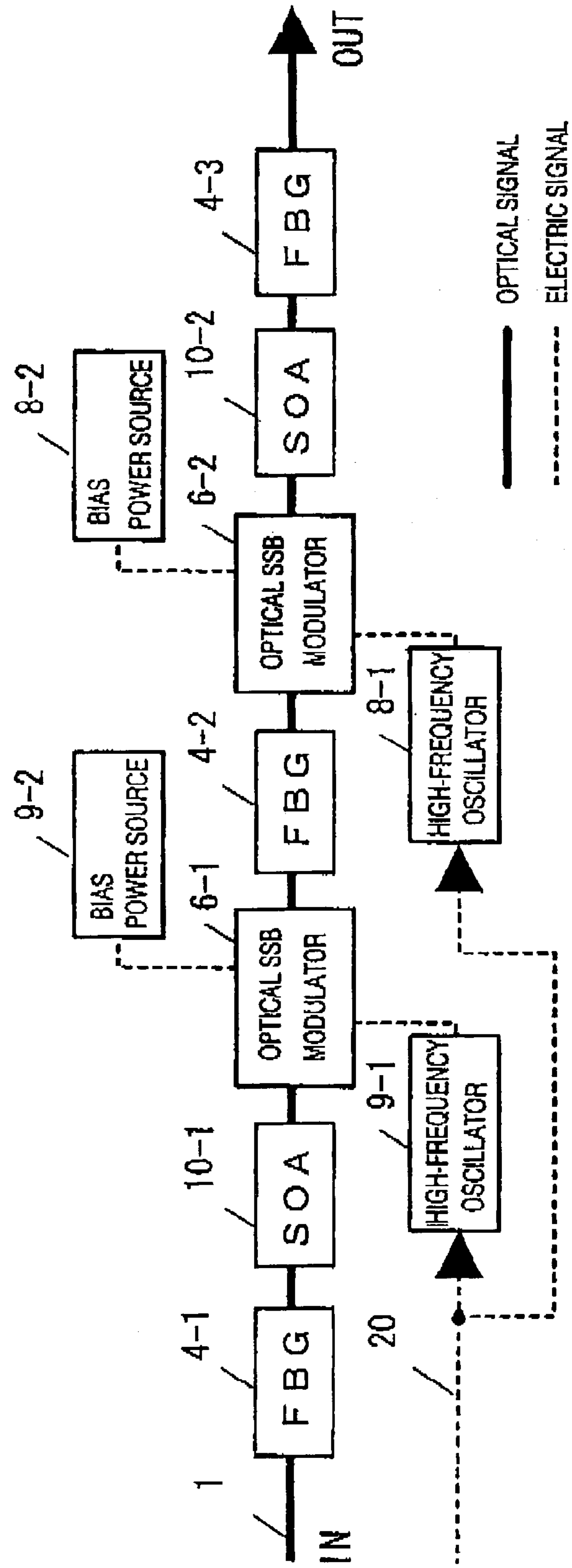
FIG. 5 is a block diagram of a fifth embodiment configured so that input and output optical signals have the same frequency.

FIG. 5 shows an example of a fifth embodiment of the variable-optical-delay apparatus configured so that the output optical signal has the same frequency as the input optical signal. With reference to the configuration of FIG. 5, optical SSB modulator 6-1 increases the frequency of the optical signal and optical SSB modulator 6-2 decreases the frequency. In each case the modulation frequency is the same, so the frequency of the output signal is the same as that of the input signal.

EXAMPLE 6

Figure 6:
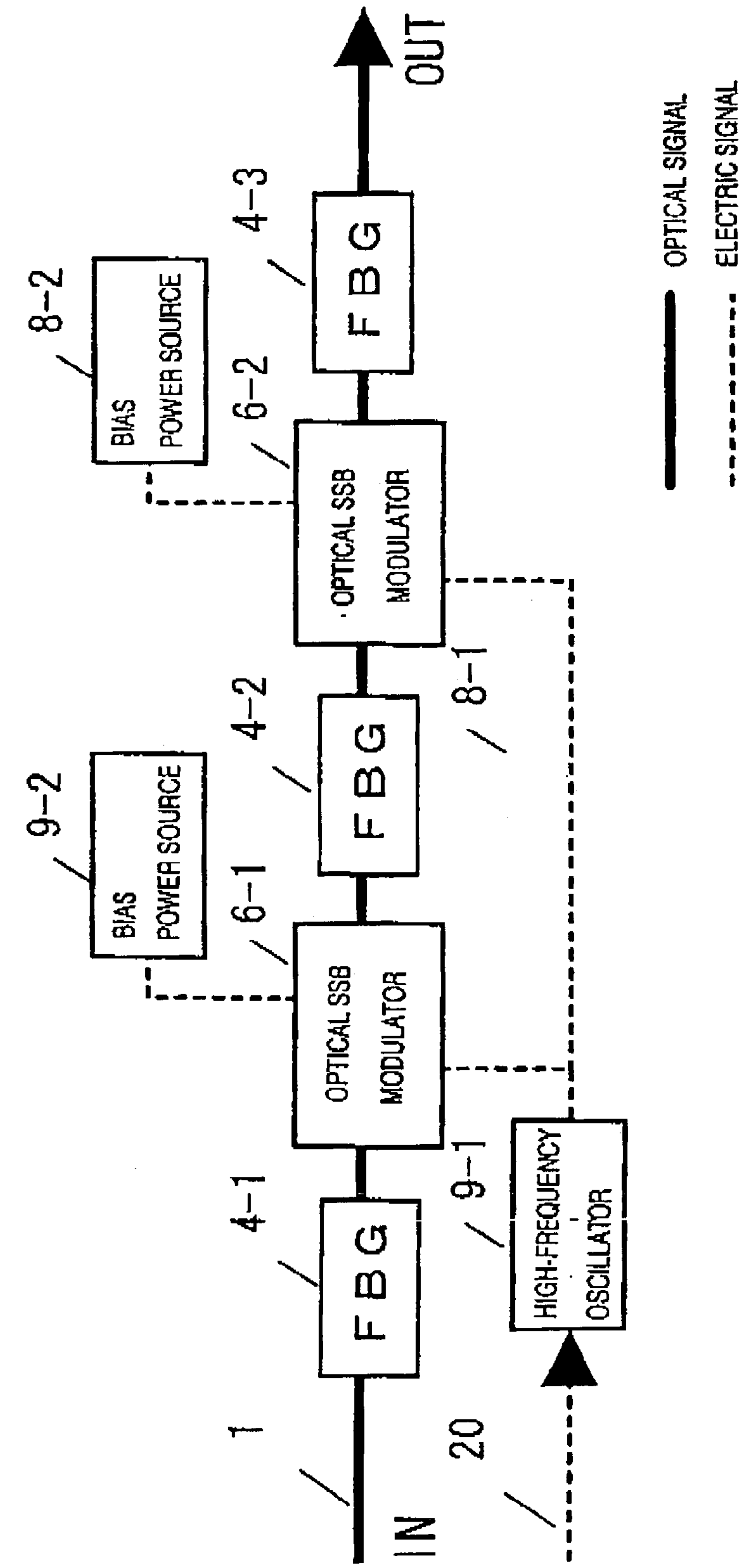
FIG. 6 is a block diagram of a sixth embodiment in which a plurality of variable-optical-delay apparatuses are arranged in series and semiconductor optical amplifiers are used to prevent any decrease in optical power.

FIG. 6 shows an example of a sixth embodiment of the variable-optical-delay apparatus of the present invention. In this embodiment, semiconductor optical amplifiers (SOA) are used to prevent a decrease in the optical power. The variable-optical-delay apparatus shown in FIG. 6 comprises a first variable-optical-delay device portion composed of FBG 4-1, SOA 10-1, optical SSB modulator 6-1 and FBG 4-2, and a second variable-optical-delay device portion composed of FBG 4-2, optical SSB modulator 6-2, SOA 10-2, and FBG 4-3, each of which applies an optical delay in different increments. As in the case of the second embodiment, it is preferable for the delay increments imposed by the first variable-optical-delay device portion to be an integer multiple of the delay increments of the second variable-optical-delay device portion. Using a multiple differential of three, for example, for a ternary system, which would make it possible to readily achieve double-digit delays.

EXAMPLE 7

Figure 7:
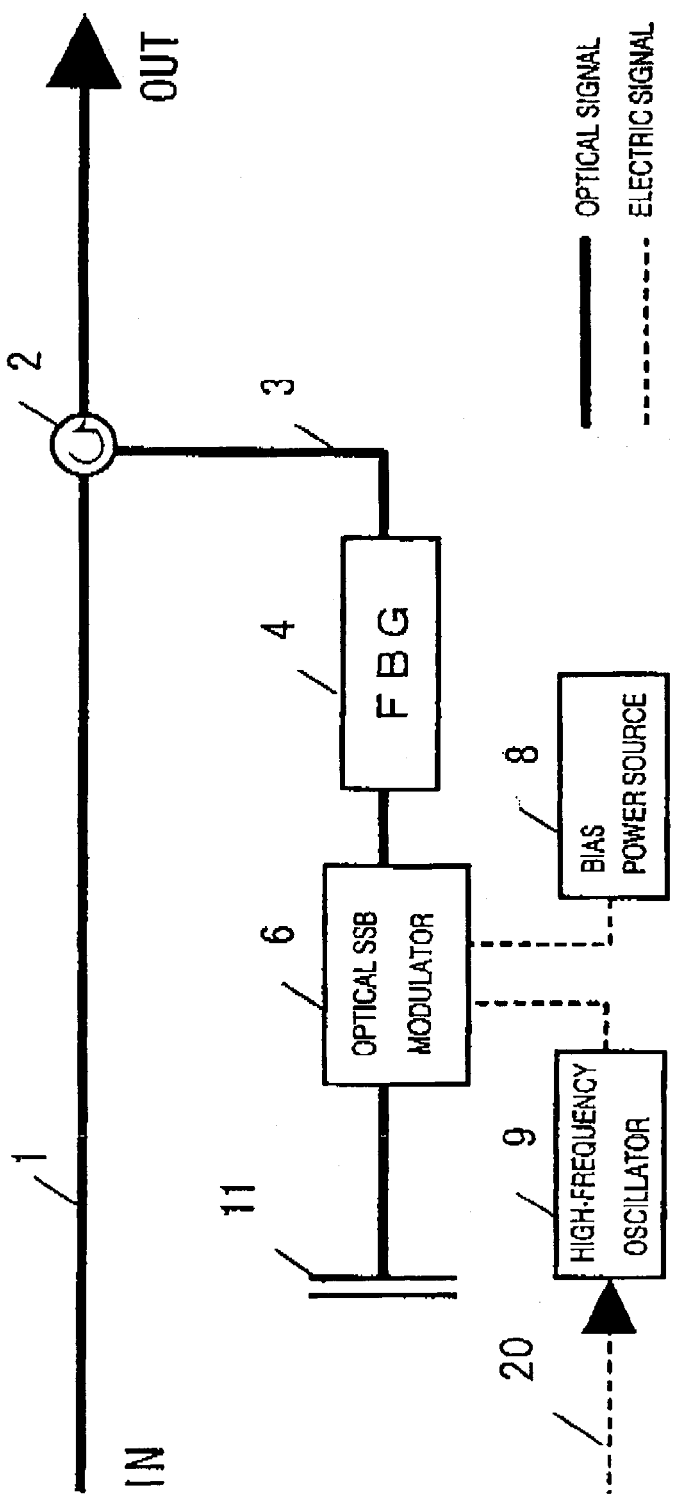
FIG. 7 is a block diagram of a seventh embodiment in which the modulator is disposed between a fiber Bragg grating filter and a reflector.

The variable-optical-delay apparatus can also be configured without the optical loop path of the above embodiments. FIG. 7 shows an example of a seventh embodiment, wherein, the variable-optical-delay apparatus comprises a FBG filter and an optical SSB modulator set between the FBG filter and a reflector 11. In this embodiment, an input optical signal (wavelength: 1549.8 nm) passes along optical path 1 and is directed onto optical path 3 by a circulator 2. Provided on the optical path 3 is a fiber Bragg grating (FBG) 4 used as a filter. The FBG 4 has a reflection band with a bandwidth of 250 GHz (1550–1551 nm). Signals transmitted by the FBG 4 are frequency-shifted by an optical SSB modulator 6, and in the course of being reflected back are again frequency-shifted, and again fall incident on the FBG 4. Since the signal is within the reflection bandwidth, it is reflected and frequency-shifted, and again falls incident on the FBG 4. If the signal is still within the reflection bandwidth, it will again be reflected. This operation is repeated until the wavelength of the optical signal is outside the reflection bandwidth, at which point it is transmitted by the FBG 4 to the circulator 2, and output via the optical path 1.

Although in the above explanation an optical SSB modulator is used as the frequency shifter, the invention is not limited thereto, and can use an acoustooptical device as the frequency shifter.

Figure 10:
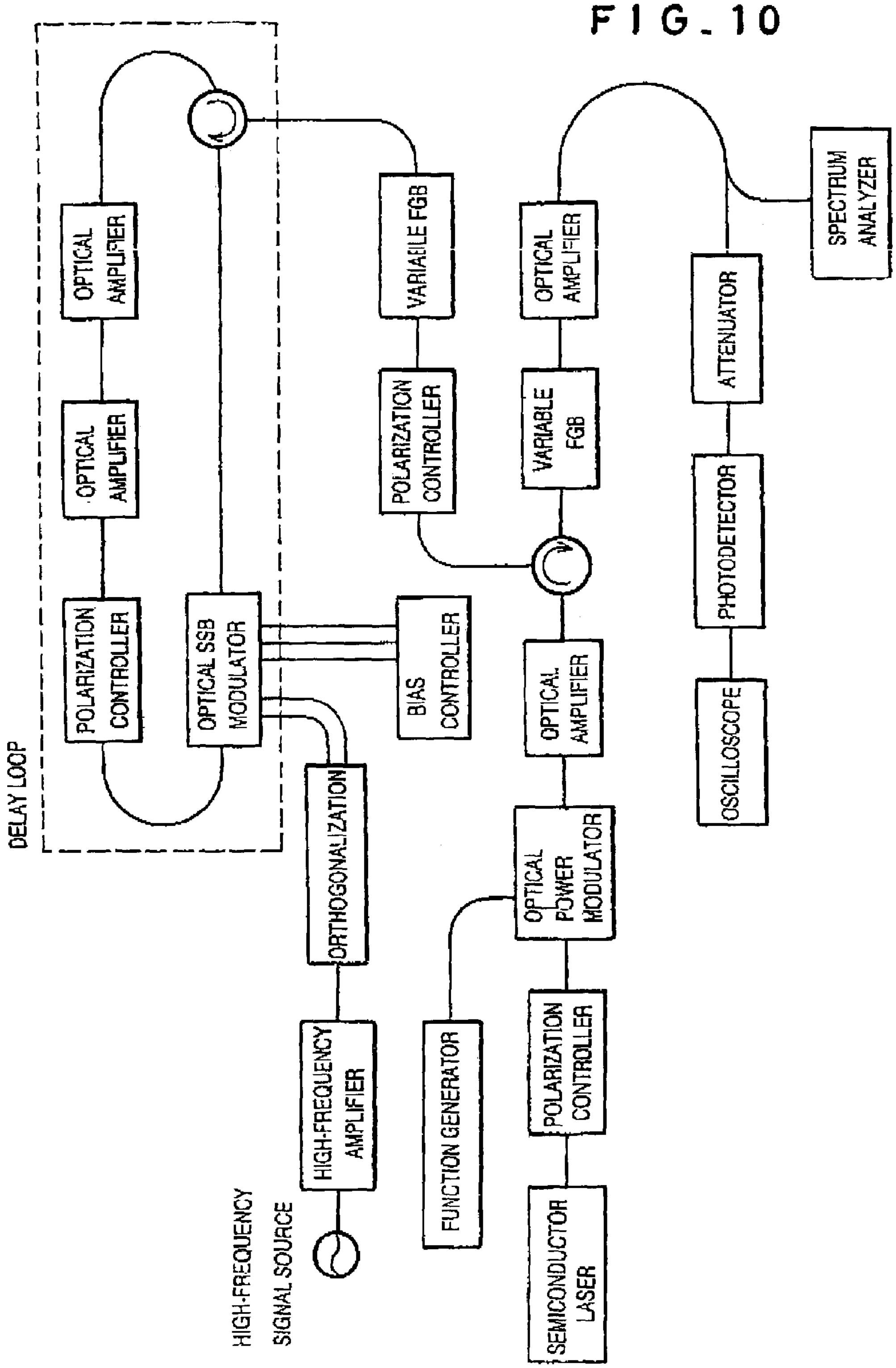
FIG. 10 is a block diagram of a basic experimental setup.

The experimental setup shown in FIG. 10 was used to confirm the delay control, and will now be explained. Part of the input lightwave is reflected by the loop input port FBG, so to suppress the effect of this, an FBG was inserted before the measurement system (a photodetector or optical spectrum analyzer). The incoming lightwave was intensity-modulated using 250-kHz pulses with a duty ratio of 20% and the time-based waveform used to confirm control of loop delay changes.

Figure 11:
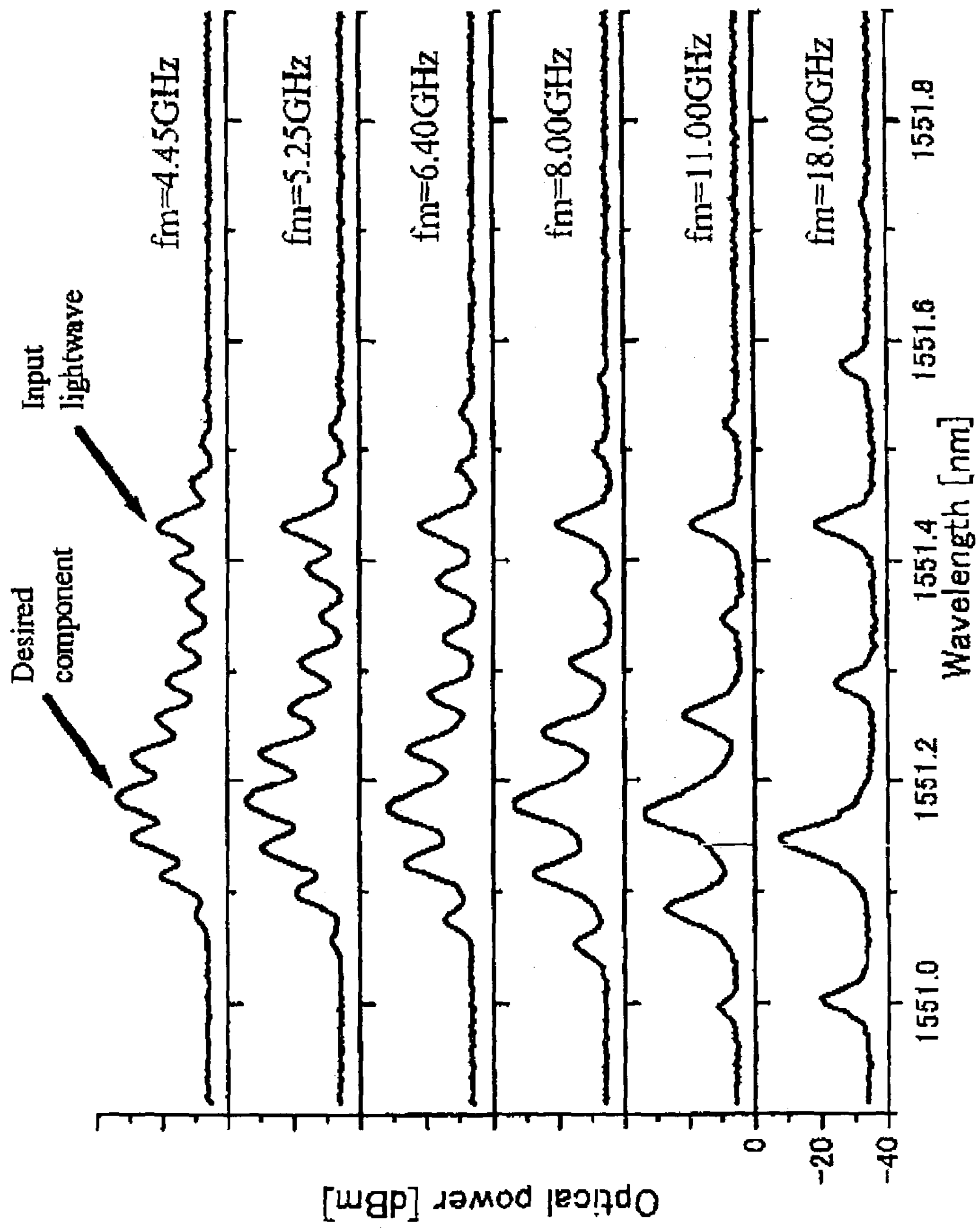
FIG. 11 shows an optical spectrum output obtained using the basic experimental setup.
Figure 12:
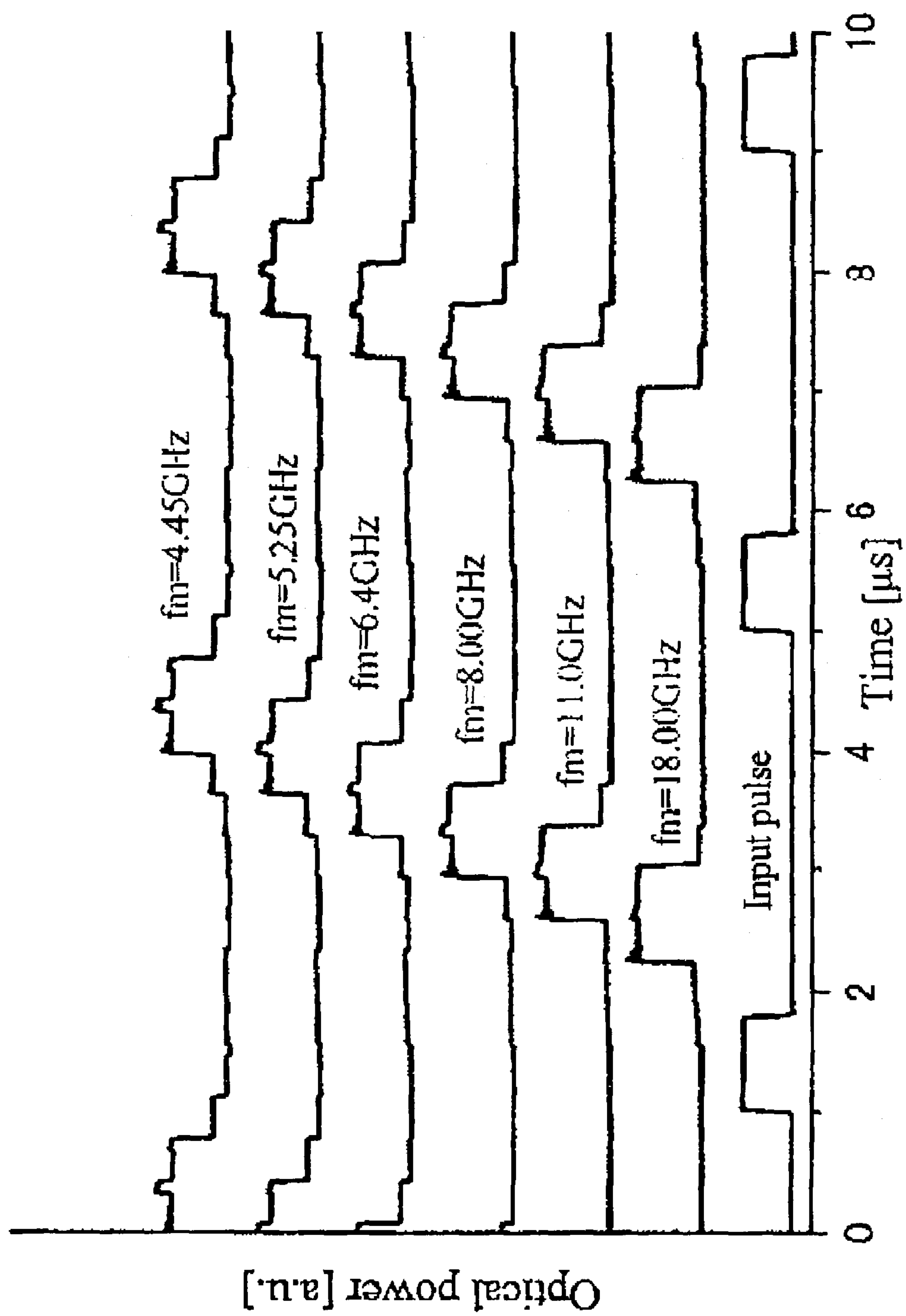
FIG. 12 shows the time-based waveform of an optical signal obtained using the basic experimental setup.

The results are shown in FIGS. 11 and 12, which show the 2nd, 3rd, 4th, 5th, 6th and 7th channel output spectrums and waveforms. Here (and below), 2nd signifies a signal output after making two circuits of the loop. The outputs were obtained from the 2nd, 3rd, 4th, 5th, 6th and 7th channels when the frequencies fm of the RF signal supplied to the optical is SSB modulator were 18.00 GHz, 11.00 GHz, 8.00 GHz, 6.40 GHz, 5.25 GHz and 4.45 GHz, respectively. The wavelength of the input lightwave was 1551.43 nm. As shown in FIG. 11, at an fm of 18.00 GHz the peak was at 1551.15 nm, which corresponded to the 2nd channel. At an fm of 11.00 GHz, a peak was seen at 1551.17 nm, corresponding to the 3rd channel. At an fm of 8.00 GHz, 6.40 GHz, 4.25 GHz and 4.45 GHz, peaks were seen in the vicinity of 1551.2 nm, corresponding to the 4th, 5th, 6th and 7th channels. With respect to the time-based waveforms of FIG. 12, with the delay times differing by 350 ns from channel to channel, it was confirmed that the delay time could be controlled by means of the RF signal frequency fm. From the delay time, it can be seen that the length of the optical loop is around 70 meters. What makes it possible for the system to handle pulses longer than the delay time imposed by one circuit of the loop is that the signals are moved to another channel by the frequency-shifting of the optical SSB modulator, thereby preventing collisions.

The present invention configured as described in the foregoing has the following effects.

In accordance with the first aspect, the configuration includes optical input and output sections, and an optical filter and a frequency shifter that can adjust the amount of frequency-shift according to the input optical signal are provided on the optical path that runs from the input section to the output section. The input optical signal is output from the output section after passing the wavelength shifter a number of times that is determined according to the input optical signal, so the amount of delay time can be controlled on a signal by signal basis.

The second and third aspects enable a simple configuration to be used to adjust the delay time according to the input optical signal.

The fourth and fifth aspects use an optical loop path, which makes it possible to reduce the size of the apparatus.

The sixth aspect uses a resonant type optical modulator, enabling a delay to be effected using less electrical power.

In the seventh aspect, the modulator is an optical SSB modulator, which provides efficient modulation.

In the eighth aspect, the variable-optical-delay apparatus is configured as a plurality of variable-optical-delay devices arranged in series, each applying a different delay time. This makes it possible to set a wide range of delay times.

The ninth aspect is configured so that the sum of frequency shifts by the frequency shifter is zero, enabling output of an optical signal having the same frequency as the input signal.

What is claimed is:

1. A variable-optical-delay apparatus comprising:

an optical input section;

an optical output section;

a first optical filter disposed on an optical path between the optical input section and the optical output section; and a unidirectional wavelength shifter disposed on an optical path between the optical input section and the optical filter and configured to adjust an amount by which a wavelength of an input optical signal is shifted in one frequency direction, wherein the input optical signal is repeatedly shifted in wavelength with each pass through the wavelength shifter to produce a shifted input optical signal until the shifted input optical signal has a wavelength that will pass the first optical filter and, after passing the first optical filter, the shifted input optical signal is output from the optical output section as a delayed input optical signal, and a delay time of the delayed input optical signal is determined by an amount the input optical signal is shifted in wavelength by each pass through the wavelength shifter.

2. A variable-optical-delay apparatus according to claim 1, further comprising:

a second optical filter disposed on the optical path between the optical input section and the wavelength shifter.

3. A variable-optical-delay apparatus according to claim 1, further comprising:

a reflector disposed on the optical path between the optical input section and the wavelength shifter.

4. A variable-optical-delay apparatus according to claim 1, further comprising:

an optical loop on the optical path formed between the optical input section and the optical output section; and a second optical filter that differs from the optical filter provided on the optical path between the optical loop and the output section;

wherein the second optical filter is provided on the optical path between the optical input section and the optical loop.

5. A variable-optical-delay apparatus according to claim 4, further comprising:

a circulator provided on the optical path at at least one end of the second optical filter, wherein the optical path is deflected by the circulator.

6. A variable-optical-delay apparatus according to any of claims 1 to 5, wherein the wavelength shifter comprises a resonant optical modulator.

7. A variable-optical-delay apparatus according to any of claims 1 to 5, wherein the wavelength shifter comprises a single-sideband modulator.

8. A variable-optical-delay apparatus according to any of claims 1 to 5, wherein the variable-optical-delay apparatus comprises a plurality of variable-optical-delay apparatuses having mutually different delay times provided along a continuous optical path.

9. A variable-optical-delay apparatus according to any of claims 1 to 5, comprising a plurality of variable-optical-delay apparatuses provided along a continuous optical path wherein a sum of optical signal frequency shifts is zero, so that an output optical signal has a same frequency as the input optical signal.

* * * * *